United States Patent
Yonezawa

[11] Patent Number: 6,095,509
[45] Date of Patent: Aug. 1, 2000

[54] CLAMPING APPARATUS

[75] Inventor: Keitaro Yonezawa, Kobe, Japan

[73] Assignee: Kabushiki Kaisha Kosmek, Japan

[21] Appl. No.: 09/209,004

[22] Filed: Dec. 11, 1998

[30] Foreign Application Priority Data

Dec. 24, 1997 [JP] Japan .................................. 9-354553

[51] Int. Cl.[7] .................................................. B23Q 3/02
[52] U.S. Cl. .......................................................... 269/309
[58] Field of Search .................................. 269/309, 310, 269/32, 48.1; 29/263, 252; 279/2.06, 2.09

[56] References Cited

U.S. PATENT DOCUMENTS

| | | |
|---|---|---|
| 3,507,028 | 4/1970 | Stellatella .................................. 29/252 |
| 4,909,493 | 3/1990 | Yonezawa . |
| 4,948,105 | 8/1990 | Yonezawa . |
| 5,096,347 | 3/1992 | Kumagai et al. . |
| 5,174,554 | 12/1992 | Yonezawa . |
| 5,810,344 | 9/1989 | Nishimoto . |

*Primary Examiner*—Robert C. Watson
*Attorney, Agent, or Firm*—Bacon & Thomas PLLC

[57] ABSTRACT

A housing (11) has a piston (17) inserted thereinto. A pull rod (12) is connected to the piston (17). An annular collet (13) is externally fitted onto the pull rod (12). When clamping, an engaging member (14) provided on a peripheral wall of the collet (13) is inserted into an engaging hole (2) of a workpiece (1) and the piston (17) is lowered. Then a tapered outer peripheral surface (12a) of the pull rod (12) diametrically expands the engaging member (14) to engage it with the engaging hole (2) and the collet (13) slightly descends against a push spring (27). Thus a downward driving force acting on the pull rod (12) is transmitted to the workpiece (1) via the engaging member (14) and the workpiece (1) is pulled and fixed to a support surface (S) of the housing (11).

20 Claims, 12 Drawing Sheets

F I G. 4
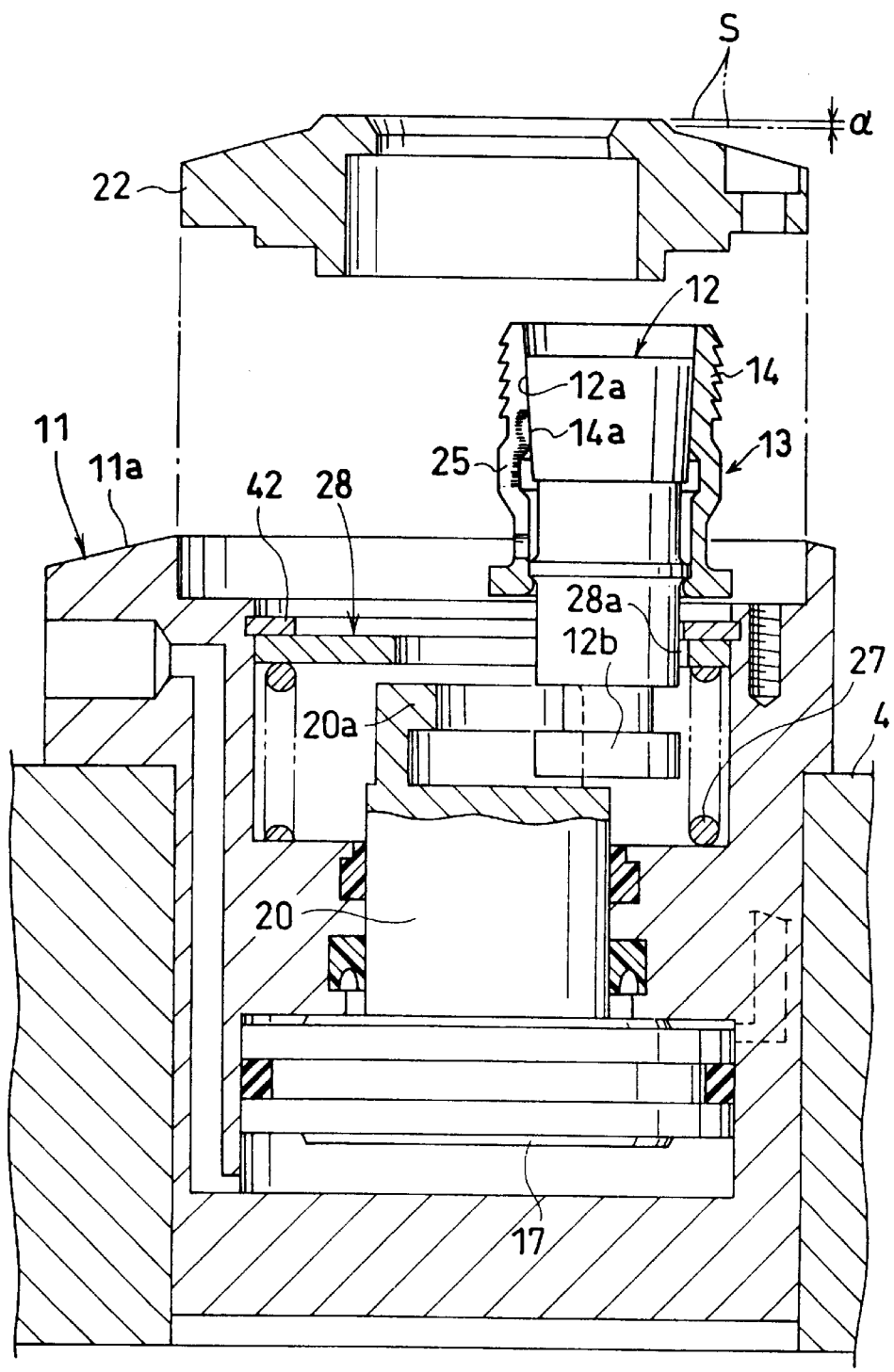

CLAMPING APPARATUS

BACKGROUND OF THE INVENTION

1. Technical Field

The present invention relates to a clamping apparatus of such a type that pulls a workpiece, a metal mold or the like object to be fixed, to a work pallet, a table or the like support pedestal and fixes it thereto.

2. Description of the Earlier Technology

A common clamping apparatus is adapted to arrange a clamping member around an object to be fixed which has been placed on a support pedestal and make the clamping member push the object to the support pedestal.

The conventional clamping apparatus arranged the clamping member around the object to be fixed. Accordingly, there was a disadvantage that the clamping member reduced a working space around the object to be fixed.

SUMMARY OF THE INVENTION

The present invention aims at proposing a clamping apparatus for improving the disadvantage.

In order to achieve the aim, the present invention has constructed a clamping apparatus in the following manner, for example, as shown in FIG. 1 to FIG. 4, FIG. 5 to FIG. 8 or FIG. 9 to FIG. 13, respectively.

The clamping apparatus comprises a driving means 15 provided within a housing 11, a pull rod 12 to be reciprocally moved in an axial direction by the driving means 15, a tapered outer peripheral surface 12a provided on the pull rod 12 so as to narrow toward a base end (first end) of the axial direction, an engaging member 14 arranged in an outer peripheral space around the tapered outer peripheral surface 12a so as to be inserted into an engaging hole 2 of an object 1 to be fixed, and a support means 29 inhibiting the engaging member 14 from displacing to the base end with a predetermined supporting force and allowing it to displace to the base end with a force larger than the supporting force. The pull rod 12, when driven toward the base end, makes the tapered outer peripheral surface 12a change over the engaging member 14 to a radially outward engaging position (X) so as to engage it with the engaging hole 2 and displaces the engaging member 14 to the base end against the support means 29. This adapts a driving force of the pull rod 12 to be transmissible to the object 1 to be fixed. On the other hand, when driven toward a leading end (second end), the pull rod 12 allows the engaging member 14 to change over to a radially inward disengaging position (Y).

It is considered to utilize an urging force of a push spring 27 in FIG. 1(A), an oil pressure force acting on a push-up piston 60 in FIG. 9, a resilient force of a lower half portion 70 of an annular member 13 in FIG. 13 or the like for the support means 29.

It is also considered to engage the engaging member 14 with the engaging hole 2 by causing the engaging member 14 to bite into the engaging hole 2 due to plastic deformation or elastic deformation or by bringing the former into frictional contact with the latter.

Further, although the tapered outer peripheral surface 12a is preferably formed to be circular when seen in cross section for the purpose of machining, it may be in a rectangular or the like polygonal shape when seen in cross section.

Additionally, the engaging hole 2 of the object 1 to be fixed also preferably has a circular shape for the purpose of machining but it may have a rectangular or the like polygonal shape, when seen in cross section. In the case where the engaging hole 2 is made polygonal, it suffices if a plurality of engaging members 14 are arranged so that they can oppose to the respective sides of the polygonal engaging hole 2.

The present invention functions in the following manner, for example, as shown in FIGS. 1(A) and 2.

In an unclamping condition of FIG. 1(A), the driving means 15 (here a piston 17) moves the pull rod 12 upward and the engaging member 14 is supported from below by the support means 29 (here the urging force of the push spring 27).

When clamping, the engaging member 14 is fitted into the engaging hole 2 of the object 1 to be fixed. In that state, the driving means 15 lowers the pull rod 12.

Then, as shown in FIG. 2, the tapered outer peripheral surface 12a of the pull rod 12 projects the engaging member 14 to the radially outward engaging position (X) to thereby engage it with the engaging hole 2. At the same time, the engaging member 14 descends by a stroke (M) against a supporting force of the support means 29 with a downward driving force of the pull rod 12. Thus the downward driving force of the pull rod 12 is transmitted to the object 1 to be fixed through the engaging member 14 and the object 1 is pulled toward the housing 11.

The clamping condition of FIG. 2 is switched over to the unclamping condition of FIG. 1 through the procedures substantially opposite to the above-mentioned ones.

In consequence, the present invention produces the following effects.

In the clamping condition, the object 1 to be fixed can open five of its six surfaces except a surface (R) to be fixed. Therefore, in the case where the object to be fixed is a workpiece, it can have the five surfaces continuously machined while being clamped to result in surprisingly enhancing the efficiency of machining. Further, in the event that the object to be fixed is a metal mold, a space around the metal mold is not reduced. This makes it possible to mount a metal mold of large size and besides improve the workability when exchanging the metal mold.

The object to be fixed can fulfil the intended purpose if it is provided with an engaging hole. It need not project an attachment for clamping. Thus the object is easily handled.

When the engaging hole is adapted to be circular in cross section, it can be easily formed by a drill, a reamer or the like. Therefore, the object to be fixed can be machined for providing the engaging hole with a good efficiency.

BRIEF DESCRIPTION OF THE DRAWINGS

FIGS. 1 to 4 show a first embodiment of the present invention;

FIG. 1(A) is a vertical sectional view of a clamping apparatus unclamped;

FIG. 1(B) is a sectional view when seen along a line 1B—1B in a direction indicated by arrows in FIG. 1(A);

FIG. 2 is a vertical sectional view of the clamping apparatus clamped;

FIG. 4 explains the procedures for removing a pull rod of the clamping apparatus;

FIG. 5 shows an engaging member of the clamping apparatus as lowered;

FIG. 6 shows the engaging member raised;

FIG. 7 shows the engaging member when it has finished an engagement;

FIG. 8 shows the engaging member when it has cancelled the engagement;

DESCRIPTION OF THE PREFERRED EMBODIMENTS

A first embodiment of the present invention is explained with reference to FIGS. 1 to 4.

Figure 3A:
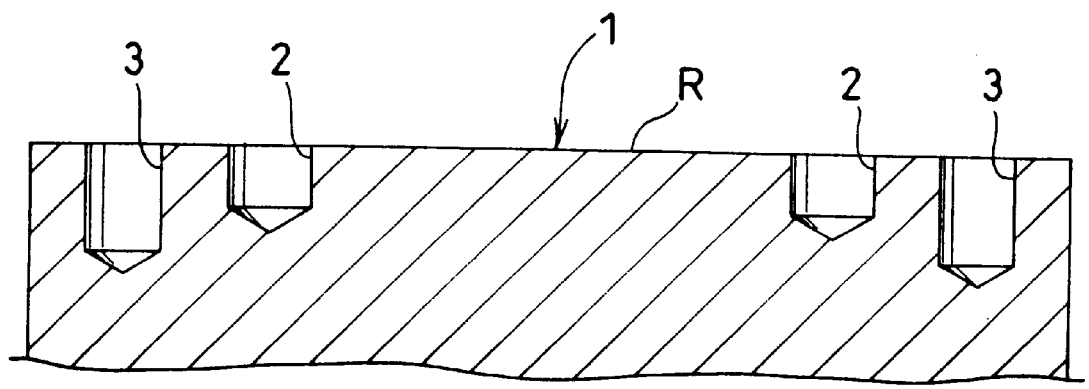
FIG. 3(A) is an elevational view of a workpiece to be fixed by the clamping apparatus.
Figure 3B:
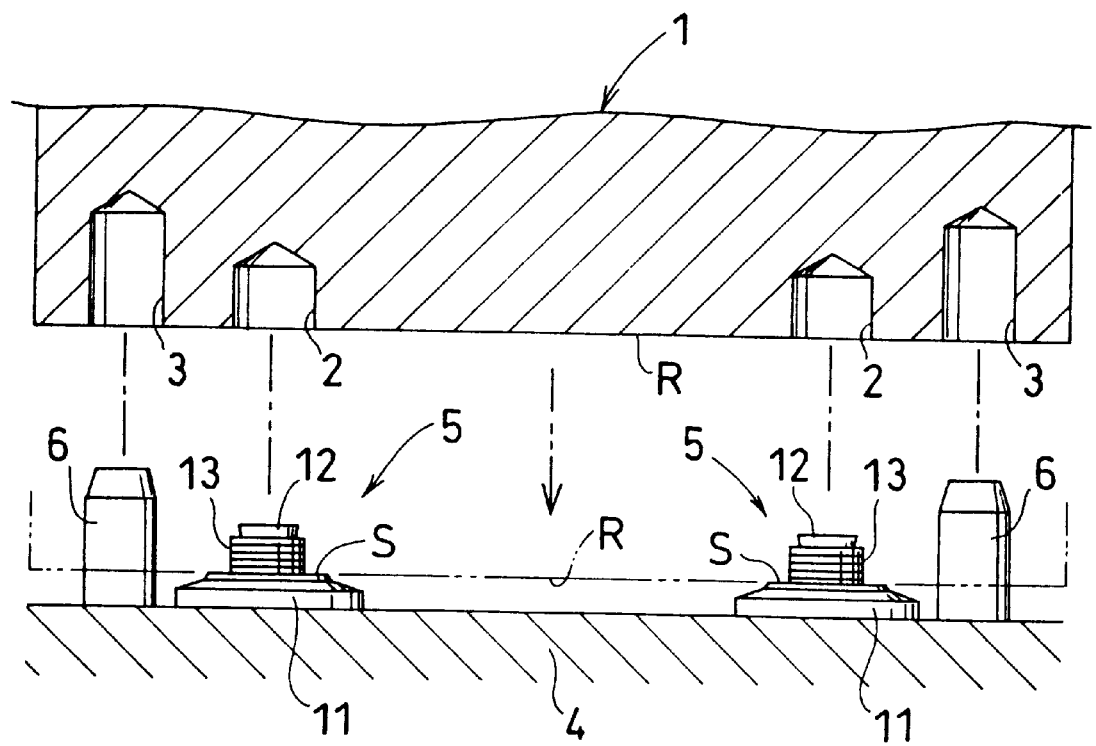
FIG. 3(B) is an elevational view showing the workpiece ready to be placed on housings of the clamping apparatuses.

First, the procedures for clamping an object to be fixed by the clamping apparatus are explained mainly based on schematic views for explaining operation in FIGS. 3(A) and 3(B).

In FIG. 3(A), numeral 1 designates a workpiece (an object to be fixed) ready to be machined by a machining center. The workpiece 1 has six surfaces of a front, a rear, an upper, a lower, a right and a left ones. The upper one of the six surfaces is preliminarily provided with a reference surface (a surface to be fixed) (R) by machining. Then the reference surface (R) is formed with a plurality of circular engaging holes 2 and a plurality of guide holes 3 (only two of each of them are shown here).

In FIG. 3(B), numeral 4 indicates a work pallet for supporting the workpiece 1. The work pallet 4 has a plurality of clamping apparatuses 5 and a plurality of guide pins 6 (here only two of each of them are shown) fixed thereto. An upper surface of a housing 11 of every clamping apparatus 5 forms a support surface (S) for receiving the workpiece 1.

On fixing the workpiece 1 to the pallet 4, as shown in FIG. 3(B), first the workpiece 1 in a posture of FIG. 3(A) is vertically reversed and the workpiece 1 in the thus reversed posture is lowered. Then, first the guide holes 3,3 are fitting onto the guide pins 6,6. Next, the engaging holes 2,2 are fitting onto pull rods 12 and collets 13 of the clamping apparatuses 5. Thus the workpiece 1 has the reference surface (R) received by the support surfaces (S),(S) as shown by a two-dot chain line in FIG. 3(B) (see FIG. 1(A)).

Thereafter, each of the clamping apparatuses 5 is clamp driven by a below-mentioned driving means 15 (see FIGS. 1 (A) and 2). Then, as shown in FIG. 2, the collet 13 diametrically expands to engage with the engaging hole 2 and the workpiece 1 is pulled downwards through the pull rod 12 and the collet 13 to thereby be fixed to the support surfaces (S),(S).

Subsequently, the pallet 4 is conveyed into a machining center and then the workpiece 1 has five of its six surfaces except the reference surface (R) continuously machined by the machining center.

When the machining is completed, first the work pallet 4 is conveyed out of the machining center and then the clamping condition is cancelled to remove the workpiece 1 from the pallet 4.

Figure 1:
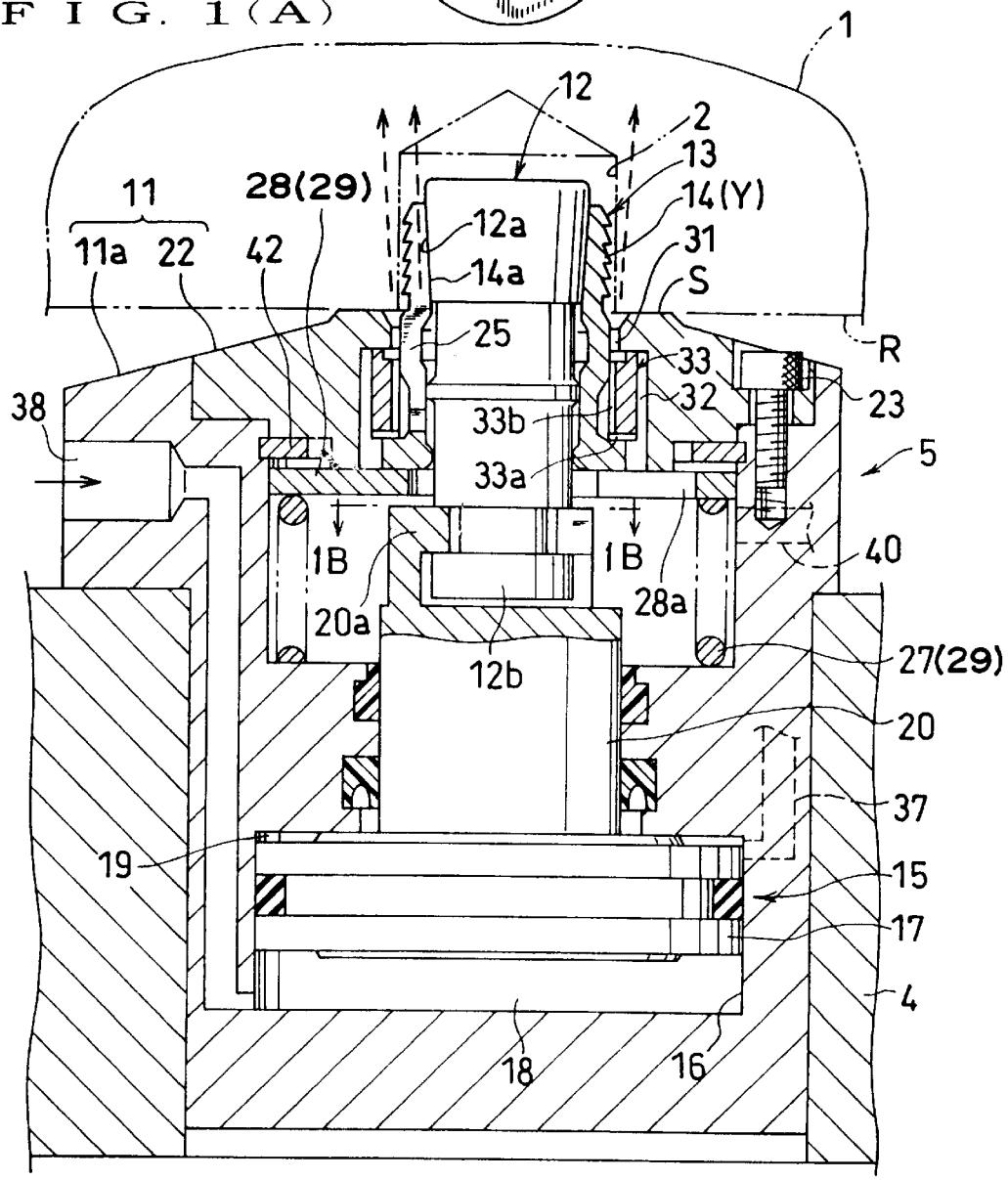
Figure 2:
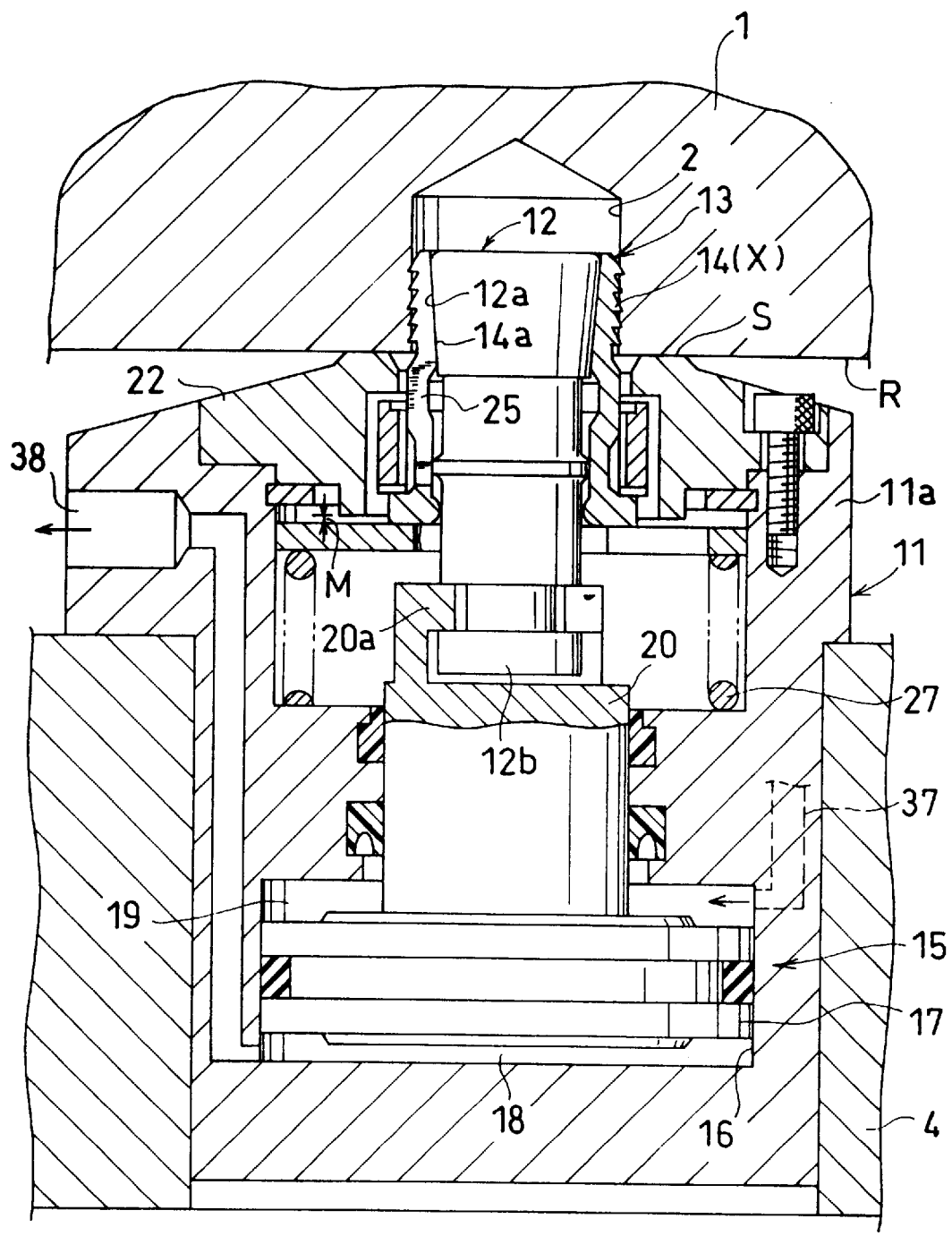

Next, FIGS. 1(A) and 1(B) and FIG. 2 explain a detailed construction of the clamping apparatus 5. FIG. 1(A) is a vertical sectional view showing an unclamping condition and FIG. 1(B) is a sectional view when seen along a line 1B—1B in a direction indicated by arrows in FIG. 1(A). FIG. 2 illustrates a clamping condition.

The driving means 15 comprises a hydraulic cylinder of double acting type. More specifically, the housing 11 comprises a main body 11a having a cylinder bore 16, into which a clamping piston 17 is inserted. The piston 17 has a lower side on which an unclamping actuation chamber 18 is formed and an upper side on which a clamping actuation chamber 19 is provided. A piston rod 20 projects upward from the piston 17.

The housing main body 11a has an upper portion detachably provided with an adapter block 22 for receiving the workpiece 1. An upper end surface of the block 22 forms the support surface (S). Numeral 23 indicates a fastening bolt (here only one is shown). The pull rod 12 is inserted into the adapter block 22 so as to be vertically movable. The pull rod 12 has an upper portion provided with a tapered outer peripheral surface 12a circular in section and narrowing downwardly, and it has an input portion 12b connected to an output portion 20a of the piston rod 20 so as to be radially movable and axially unmovable.

The above-mentioned annular collet (annular member) 13 is externally fitted onto the pull rod 12 vertically movably. The collet 13 has a peripheral wall provided with a slit 25 extending vertically. An upper half portion of the peripheral wall forms an engaging member 14. The engaging member 14 has a tapered inner peripheral surface 14a externally fitted onto the tapered outer peripheral surface 12a of the pull rod 12. The engaging member 14 has an outer peripheral surface provided with a plurality of peripheral grooves shaping a saw-tooth when seen in section.

The collet 13 is pushed up by a push spring 27 and an annular plate 28. These push spring 27 and annular plate 28 compose a support means 29.

Further, a first annular gap 31 is defined between an outer peripheral surface at a mid-height portion of the collet 13 and an upper end portion of the adapter block 22. In addition, a second annular gap 32 is formed between an outer peripheral surface of a sleeve 33 externally fitted onto a lower half portion of the collet 13 and the block 22.

The clamping apparatus 5 operates as follows.

When starting the workpiece 1 to descend as shown by a full line in FIG. 3(B), the clamping apparatus 5 has been switched over to the unclamping condition of FIG. 1(A).

More specifically, pressurized oil of the clamping actuation chamber 19 has been discharged through a clamping port 37 and been supplied to the unclamping actuation chamber 18 through an unclamping port 38. Thus the pull rod 12 has advanced to its upper limit position by the piston rod 20 and at the same time the collet 13 has advanced to its upper limit position by the push spring 27. The engaging member 14 has been changed over to a disengaging position (Y).

In the unclamping condition of FIG. 1(A), cleaning compressed air is supplied to a cleaning fluid supply port 40 of the housing 11. Then the compressed air passes through sleeve grooves 33a, 33b and is discharged upwardly out of the first annular gap 31 and the slit 25 of the collet 13.

And when the workpiece 1 descends, the compressed air discharged from the annular gap 31 (and the slit 25 of the collet 13) blows away dust, chips and the like foreign matters adhered to the engaging hole 2 of the workpiece 1 and cleans it. This can prevent the pull rod 12 and the collet 13 from mis-fitting into the engaging hole 2.

On the descent of the workpiece 1, if an axis of the engaging hole 2 misaligns with an axis of the pull rod 12, existence of the foregoing two annular gaps 31,32 moves the pull rod 12 and the collet 13 horizontally to automatically correct the misalignment of the axes.

Thus the engaging hole 2 is smoothly fitted onto the pull rod 12 and the collet 13, and the workpiece 1 has the reference surface (R) received by the support surface (S) of the housing 11.

Just before the reference surface (R) is received by the support surface (S), a clearance between both of the surfaces (R) and (S) is narrowed and the compressed air flows through the narrowed clearance so vigorously that it can strongly clean the both surfaces (R) and (S). Therefore, the workpiece 1 can be positioned with respect to the housing 11 with a good accuracy.

Next, the pressurized oil is discharged from the unclamping actuation chamber 18 and is supplied to the clamping actuation chamber 19, thereby enabling an oil pressure force acting on the piston 17 to lower the pull rod 12. Then, as shown in FIG. 2, the engaging member 14 of the collet 13 diametrically expands by the tapered outer peripheral surface 12a to be changed over to an engaging position (X). The thus changed over engaging member 14 engages with the engaging hole 2 of the workpiece 1. In other words, the pull rod 12, when driven downwards, makes the tapered outer peripheral surface 12a change over the engaging member 14 to the engaging position (X) far away from an axis of the pull rod 12. And in this embodiment, the engaging member 14 engages with the engaging hole 2 in such a state that a saw-tooth portion on the outer peripheral surface of the engaging member 14 causes a peripheral wall of the engaging hole 2 to make a plastic deformation and the saw-tooth portion bites into the thus deformed peripheral wall.

Simultaneously with that engagement, the collet 13 slightly descends by a stroke (M) against the push spring 27 with a downward driving force of the pull rod 12. Thus the downward driving force of the pull rod 12 is transmitted to the workpiece 1 through the engaging member 14 and as a result the workpiece 1 is fixed to the housing 11.

In the above-mentioned clamping condition, the cleaning compressed air is inhibited from leaking out to result in increasing pressure at the supply port 40. Therefore, it is possible to judge whether or not the clamping apparatus 5 is in the clamping condition, by detecting the pressure increase through a pressure switch (not shown).

When cancelling the clamping condition of FIG. 2, the pressurized oil is discharged from the clamping actuation chamber 19 and is supplied to the unclamping actuation chamber 18, thereby raising the pull rod 12 relatively to the engaging member 14 engaged with the engaging hole 2. Then, as shown in FIG. 1(A), the engaging member 14 diametrically contracts by its own resilient force to be changed over to the disengaging position (Y) and thereby cancels the engagement. In other words, the pull rod 12, when driven upwards, allows the engaging member 14 to change over to the disengaging position (Y) close to the axis. Thereafter, when the workpiece 1 is moved upward, it is smoothly extracted from the engaging member 14.

After a plurality of clamping apparatuses 5 have been installed on the work pallet 4, the support surface (S) of every housing 11 is cut to the same level prior to using it.

Speaking it in more detail, as shown in FIG. 4, the adapter block 22 has an upper end surface provided with a working allowance ($\alpha$) of a predetermined dimension. The working allowance ($\alpha$) is cut through the following procedures.

In the condition of FIG. 1(A) with the workpiece 1 not yet placed, first the piston 17 is driven to its lower limit position, thereby lowering the pull rod 12 to its lower limit position relatively to the collet 13 (see FIG. 4). In that state, the piston 17 is driven upward to have the pull rod 12 and the collet 13 raised.

Next, as shown in FIG. 4, the block 22 is removed from the housing main body 11a. At this time, the push spring 27 has its urging force received by a retaining ring 42 through the annular plate 28. Subsequently, the sleeve 33 (see FIG. 1(A)) is extracted upwardly. At the same time, the pull rod 12 and the collet 13 are moved along a cut-out portion 28a of the annular plate 28 to the right and then extracted upwardly. Thereafter, the block 22 is attached to the housing main body 11a again and then the working allowance (a) is cut.

And after the cutting work, the block 22 is removed from the housing main body 11a. Then the pull rod 12, the collet 13 and the sleeve 33 (see FIG. 1(A)) are incorporated into the housing 11 through the procedures substantially opposite to the above-mentioned ones.

The foregoing embodiment produces the following advantages.

The annular collet 13 is externally fitted onto the pull rod 12 so as to be axially movable and the peripheral wall of the collet 13 is provided with the engaging member 14. Therefore, the engaging member 14 can be reliably supported by a simple structure. Besides, since the peripheral wall of the collet 13 composes the engaging member 14, the collet 13 can change over the engaging member 14 from the engaging position (X) to the disengaging position (Y) with its own resilient force and therefore the change-over can be effected by a simple means.

Further, the support means 29 is adapted to comprise the push spring 27 and accordingly can be made simple and compact.

Moreover, even if the support surface (S) is damaged due to wearing off and the like, it is sufficient to replace the adapter block 22 by new one with respect to the housing main body 11a. Therefore, the clamping apparatus 5 can be used over a prolonged period of time. Besides, the pull rod 12 and the collet 13 can be easily removed by detaching the block 22, so that it does not take much labor to conduct the maintenance work for the pull rod 12 and the collet 13.

According to an experiment result, the tapered outer peripheral surface 12a of the pull rod 12 is preferable if it has a gradient within a range of about 2 degrees to about 15 degrees. A more preferable gradient is within a range of about 2 degrees to about 10 degrees and the most preferable one is within a range of about 4 degrees to about 6 degrees.

When the inclination degree is expressed by a cone angle instead of by the gradient, the tapered outer peripheral surface 12a is preferable if it has a cone angle within a range of about 4 degrees to about 30 degrees. A more preferable cone angle is within a range of about 4 degrees to about 20 degrees and the most preferable one is within a range of about 8 degrees to about 12 degrees.

In the first embodiment, a working fluid for the driving means 15 of fluid pressure type may be other kinds of liquid or gas such as compressed air instead of the pressurized oil. The cleaning fluid may be other kinds of gas such as nitrogen gas or liquid instead of the compressed air.

While FIG. 5 to FIG. 8 show another embodiment, FIG. 9 to FIG. 13 illustrate other different embodiments, respectively. In these other embodiments, in principle, the same characters are put to the members having the same structures as those of the first embodiment.

Figure 5:
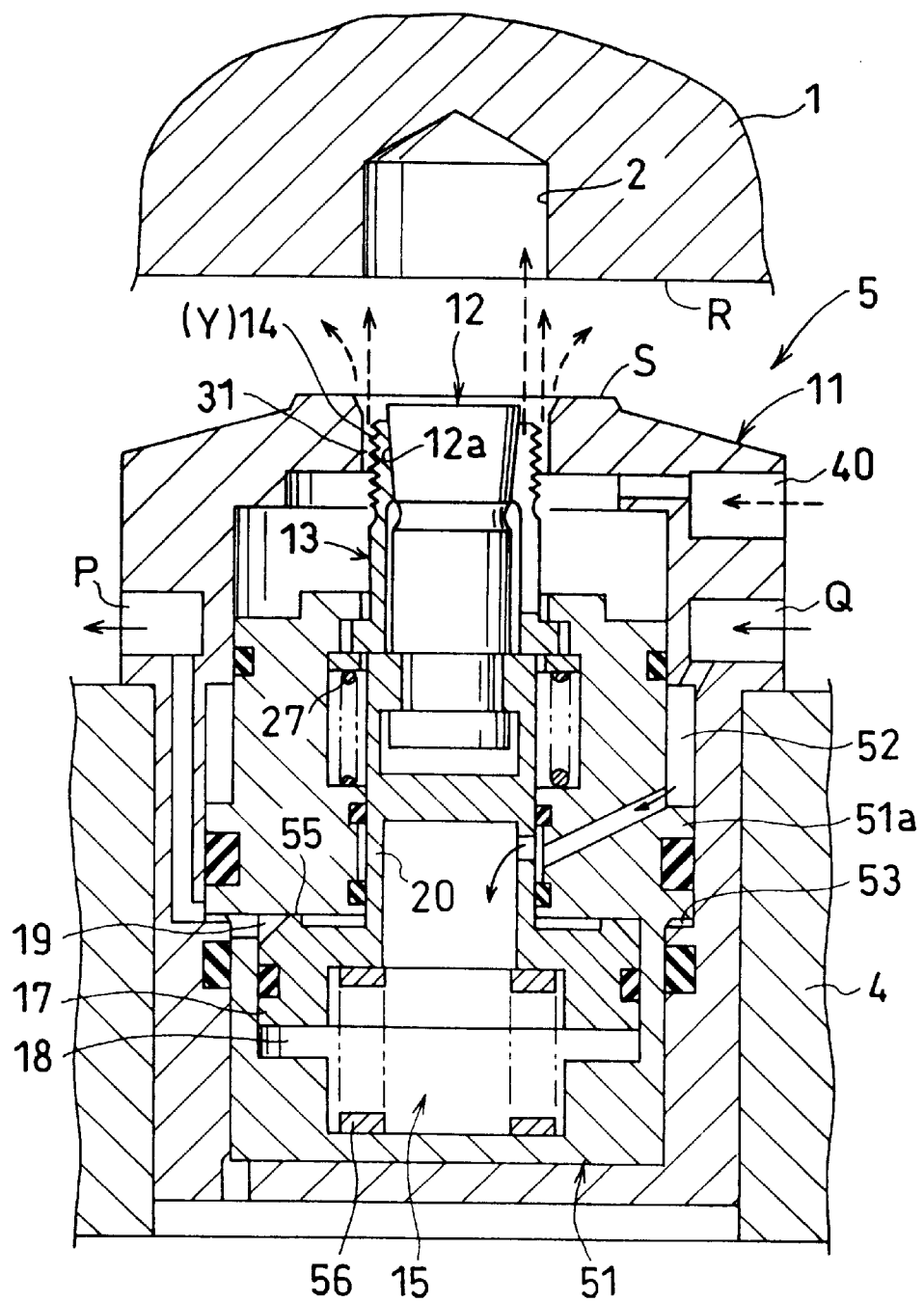
FIGS. 5 to 8 illustrate a second embodiment of the present invention.

FIG. 5 to FIG. 8 show a second embodiment. This second embodiment arranges a lift member 51 of piston type vertically movably within the housing 11, as shown in FIG. 5. The lift member 51 is provided with the driving means 15 and the pull rod 12. The lift member 51 comprises a main piston 51a having an upper side provided with a lowering actuation chamber 52. This chamber 52 is communicated with the unclamping actuation chamber 18. The main piston 51a has a lower side provided with a raising actuation chamber 53. This chamber 53 is communicated with the clamping actuation chamber 19.

In a retreated condition of FIG. 5, pressurized oil is discharged through a first port (P) and is supplied to the lowering actuation chamber 52 through a second port (Q), thereby lowering the lift member 51 to its lower limit position to retreat the pull rod 12 and the collet 13 downwards of the support surface (S) of the housing 11. Thus the support surface (S) can be cut by a predetermined working allowance as well as in the first embodiment. And in that retreated condition, cleaning compressed air is discharged through the annular gap 31 defined between the collet 13 and an upper portion of the housing 11. The engaging member 14 of the collet 13 has an outer peripheral surface provided with triangular peripheral grooves.

The piston 17 within the lift member 51 is raised by an oil pressure force of the unclamping actuation chamber 18. The piston 17 has an upper surface provided with an annular closing projection 55, which is brought into closing contact with an upper wall of the clamping actuation chamber 19.

When clamping, the workpiece 1 is placed on the support surface (S) of the housing 11. Thereafter, the pressurized oil is discharged from the lowering actuation chamber 52 and is supplied to the raising actuation chamber 53.

Figure 6:
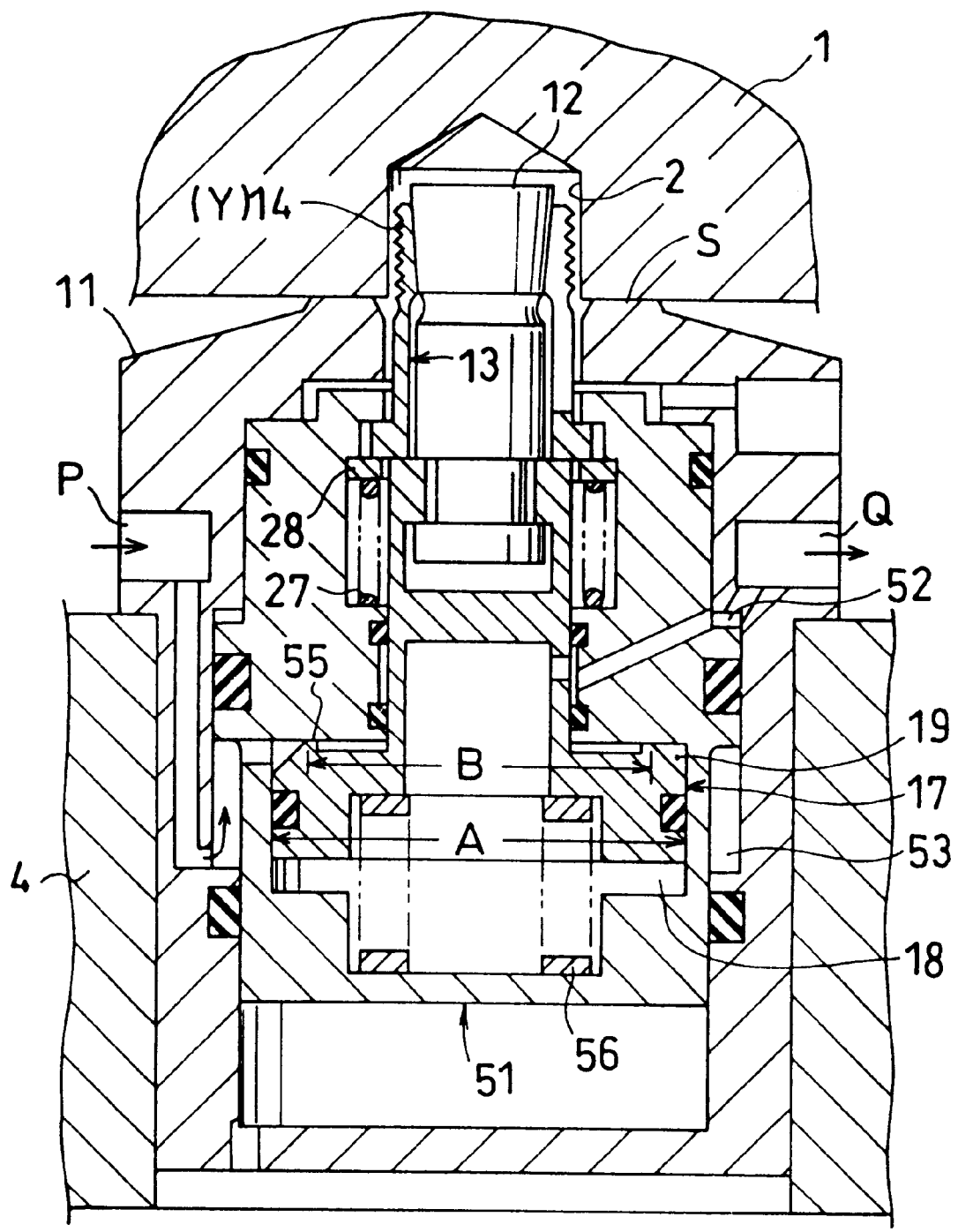

At a prior half time of pressure increase when the raising actuation chamber 53 has a lower pressure, as shown in FIG. 6, the piston 17 is held at a raised position by a back-up spring 56 and only the lift member 51 goes up to thereby insert the pull rod 12 and the engaging member 14 into the engaging hole 2 of the workpiece 1 while aligning them.

Speaking it in more detail, when the closing projection 55 is in the closing condition, a pressure force acts on an upper surface of the piston 17 only in an annular small area, which is a difference obtained by subtracting a sectional area corresponding to a diameter (B) of the closing projection 55 from a sectional area corresponding to a diameter (A) of the piston 17. Accordingly, in a state where the raising actuation chamber 53 (and the clamping actuation chamber 19 communicated therewith) each have a pressure lower than a predetermined one, the back-up spring 56 has an urging force larger than a hydraulic lowering force acting on the piston 17 and therefore the piston 17 is held in a raised state.

Figure 7:
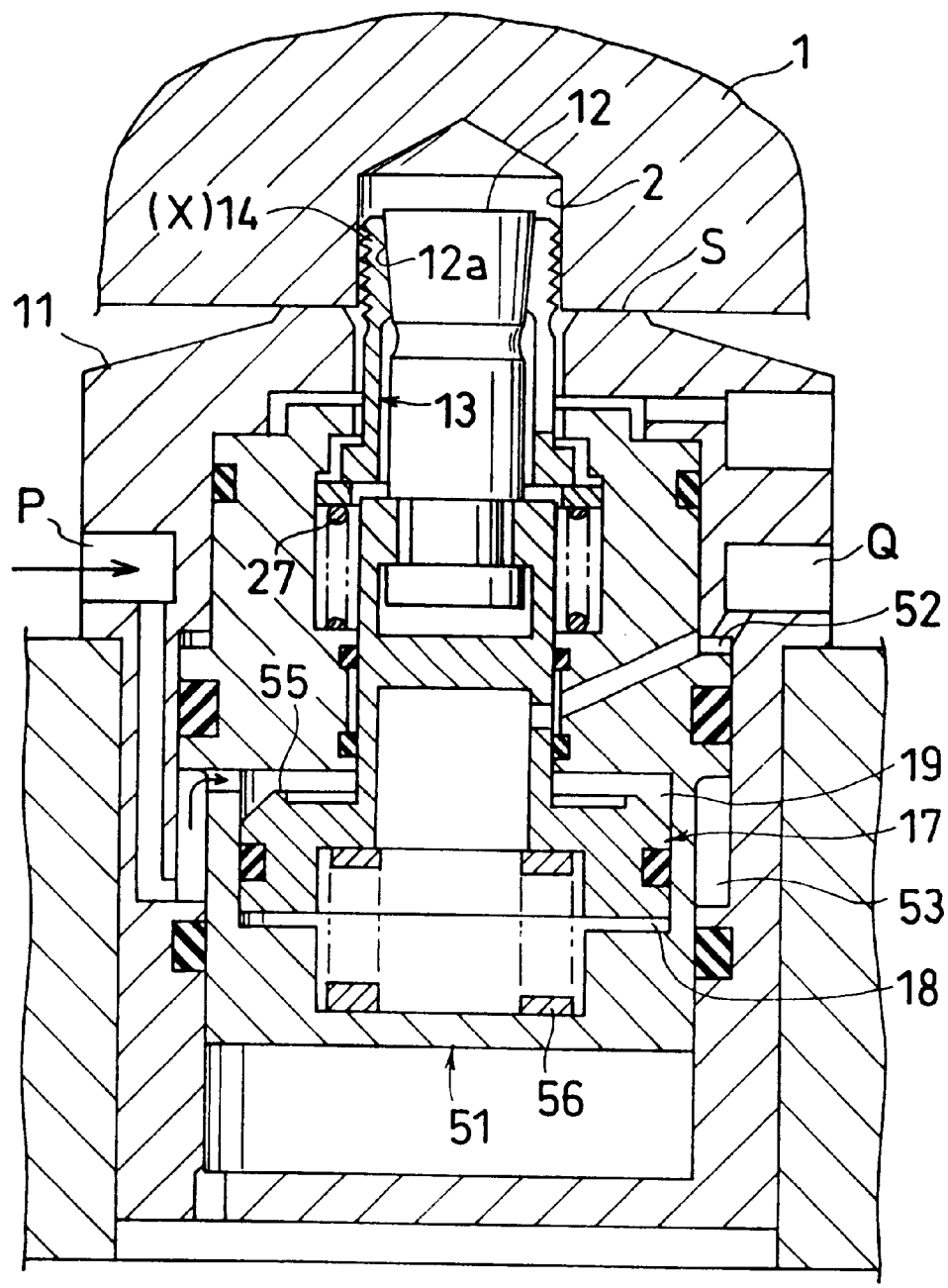

When the raising actuation chamber 53 (and the clamping actuation chamber 19) each have a pressure not less than the predetermined one, the piston 17 is lowered against the spring 56 and the closing projection 55 is separated from the upper wall of the clamping actuation chamber 19. Then as shown in FIG. 7, an oil pressure force of the clamping actuation chamber 19 acts on the piston 17 in its entirety to strongly lower the piston 17 against the spring 56. Thus, like the first embodiment, the pull rod 12 drives the workpiece 1 downward through the engaging member 14 to pull and fix the workpiece 1 to the support surface (S).

In order to put into practice such a sequence operation as lowering the clamping piston 17 after having raised the lift member 51 as mentioned above, the piston 17 is provided with the closing projection 55. Accordingly, the back-up spring 56 for holding the piston 17 at the raised position can fulfil the intended purpose only if it has a small urging force. This results in decreasing a reduction of the clamping force and besides making the housing 11 compact.

Figure 8:
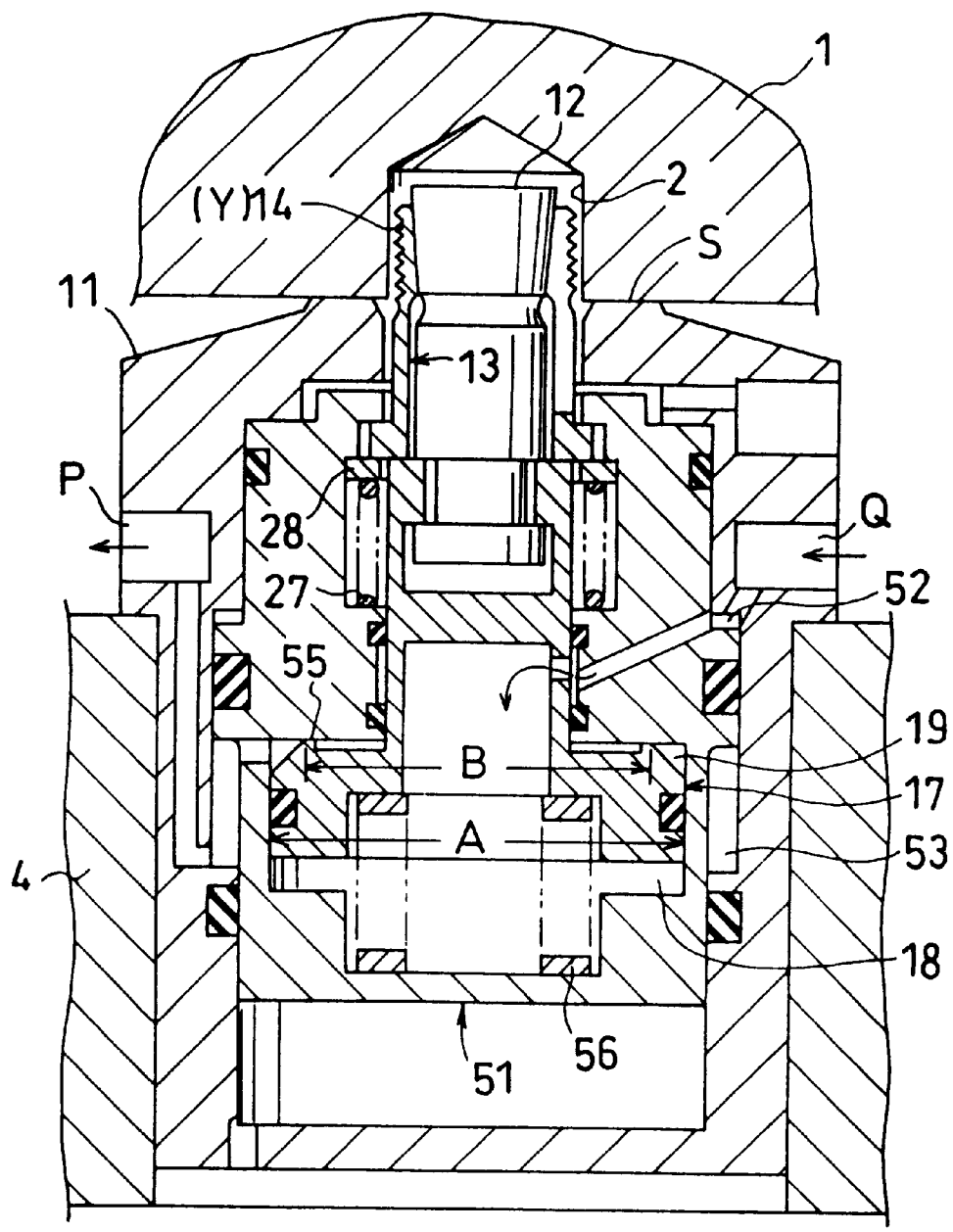

When cancelling the clamping condition, the pressurized oil is discharged from the raising actuation chamber 53 and is supplied to the lowering actuation chamber 52. At an initial time of the pressurized oil supply, the lift member 51 is inhibited from descending by the engaging member 14 which is being engaged with the engaging hole 2. Therefore, the unclamping actuation chamber 18 raises the piston 17 with its oil pressure force, thereby moving the pull rod 12 upward relatively to the engaging member 14 which is being engaged as mentioned above. Subsequently, as shown in FIG. 8, the engaging member 14 returns to the disengaging position (Y) with its own resilient force. Thus the lowering actuation chamber 52 lowers the lift member 51 with its oil pressure force to thereby return the clamping apparatus 5 to the retreated condition of FIG. 5.

Figure 9:
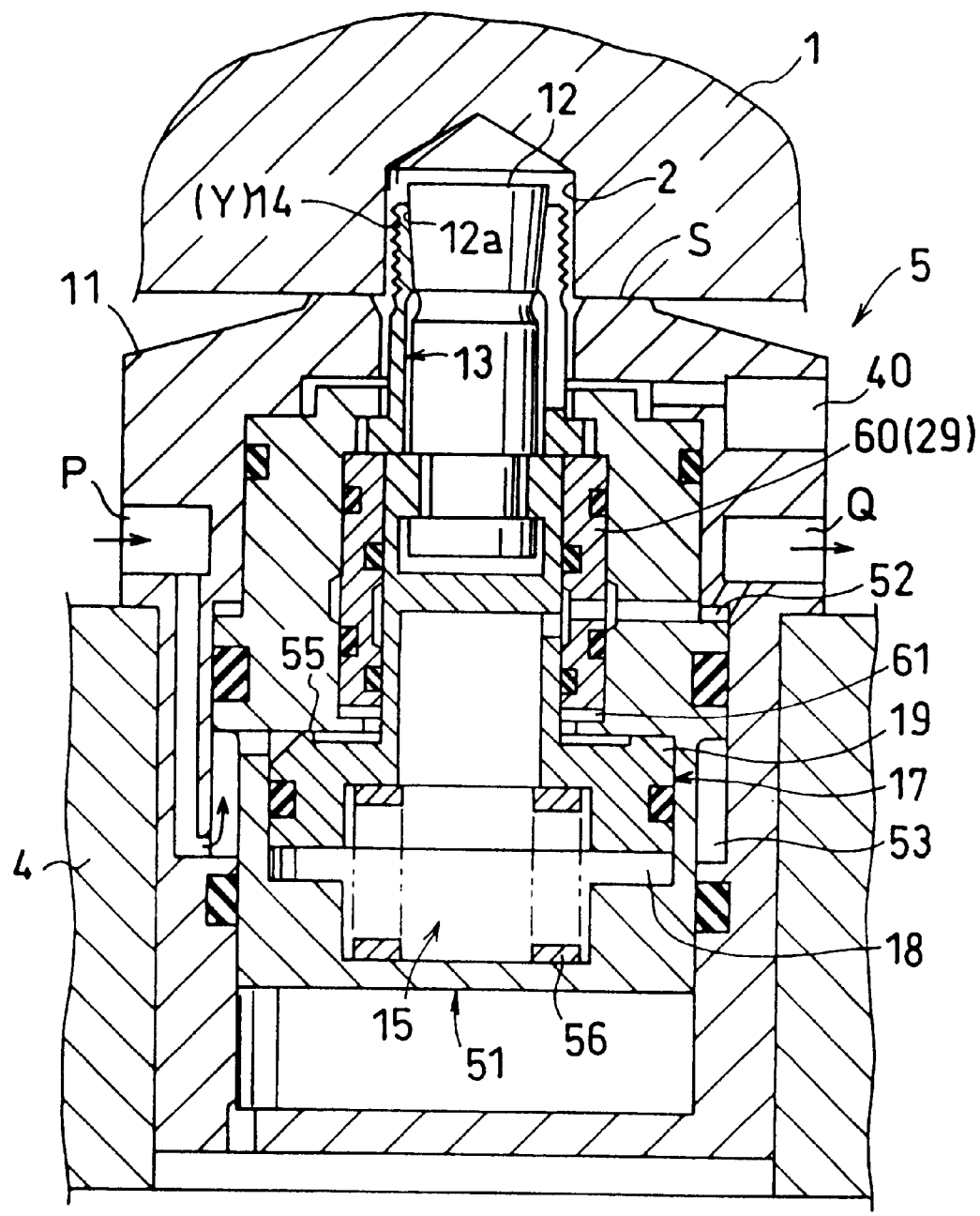
FIG. 9 shows a third embodiment of the present invention and corresponds to FIG. 6.

FIG. 9 shows a third embodiment and correspond to FIG. 6 of the above-mentioned second embodiment.

FIG. 9 illustrates an apparatus different from the apparatus of FIG. 6 in that a push-up piston 60 is provided instead of the push spring 27 and the annular plate 28 shown in FIG. 6 and that the push-up piston 60 composes the support means 29 with a push-up chamber 61.

Speaking it in more detail, in FIG. 9, pressurized oil of lower pressure supplied to the raising actuation chamber 53 through the first port (P) has moved the lift member 51 upward and the collet 13 has the engaging member 14 inserted into the engaging hole 2 of the workpiece 1. Likewise the second embodiment of FIG. 6, when the raising actuation chamber 53 has a pressure not less than a predetermined one, the clamping piston 17 has the closing projection 55 separated from the upper wall of the clamping actuation chamber 19. Then the pressurized oil within the clamping actuation chamber 19 flows into the push-up chamber 61 to hold the push-up piston 60 at a raised position and the raised push-up piston 60 supports the collet 13 with a predetermined force.

Next, the clamping actuation chamber 19 drives the clamping piston 17 downward with its oil pressure force, thereby driving the pull rod 12 downward relatively to the raised collet 13. Then the collet 13 has the engaging member 14 engaged with the engaging hole 2 and at the same time the pull rod 12 moves the collet 13 slightly downward with its downward driving force against the upward supporting force of the push-up piston 60. This makes it possible to transmit the downward driving force of the pull rod 12 to the workpiece 1 through the engaging member 14.

Figure 10:
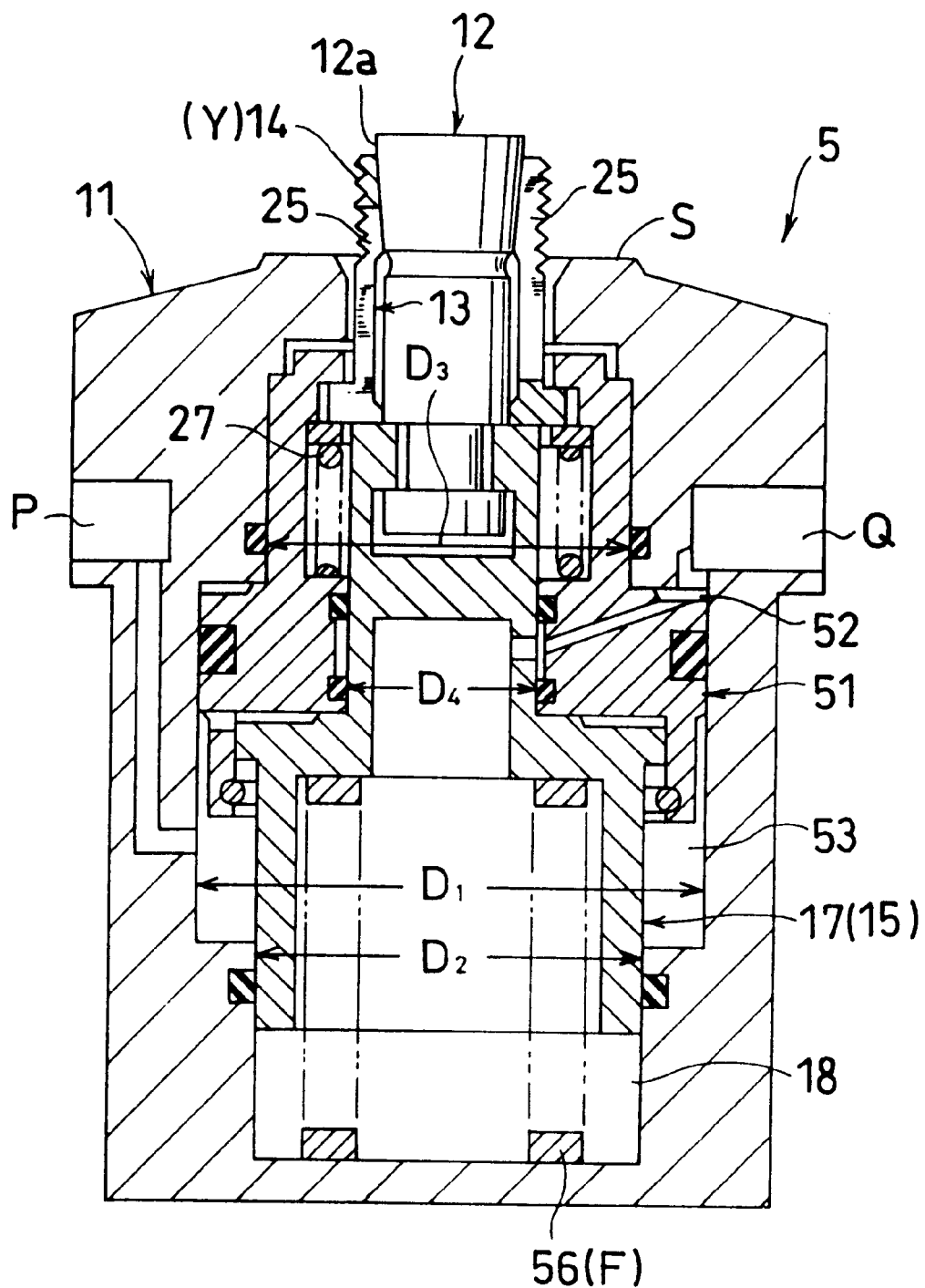
FIG. 10 shows a fourth embodiment of the present invention and corresponds to FIG. 6.

FIG. 10 illustrates a fourth embodiment and corresponds to FIG. 6. It shows both of the first and second ports (P) and (Q) supplied with no pressurized oil.

In this case, if the lift member 51 of piston type and the clamping piston 17 are presumed to have the respective sealing diameters of $D_1$, $D_2$, $D_3$ and $D_4$ as shown and the back-up spring 56 is assumed to have an upward urging force indicated by character (F), a value of a downward oil pressure force acting on an annular sectional area obtained by subtracting a sectional area corresponding to the $D_3$ from a sectional area corresponding to the $D_1$ is set to become larger than a total value of an upward oil pressure force acting on a sectional area corresponding to the $D_2$ and the upward urging force (F) of the spring 56.

In consequence, when the pressurized oil is supplied to the lowering actuation chamber 52 through the second port (Q), the lift member 51 lowers the piston 17 to thereby retreat the pull rod 12 and the collet 13 downwards of the support surface (S) of the housing 11.

Further, when the pressurized oil is discharged through the second port (Q) and is supplied to the raising actuation chamber 53 through the first port (P), first the lift member 51 ascends with an oil pressure force acting on an annular sectional area obtained by subtracting a sectional area corresponding to the $D_4$ from the sectional area corresponding to the $D_1$ and with the urging force (F) of the spring 56. Thereafter, the clamping piston 17 descends against the spring 56 with an oil pressure force acting on an annular sectional area obtained by subtracting the sectional area corresponding to the $D_4$ from the sectional area corresponding to the $D_2$. Thus the piston 17 drives the pull rod 12 downward.

Figure 11:
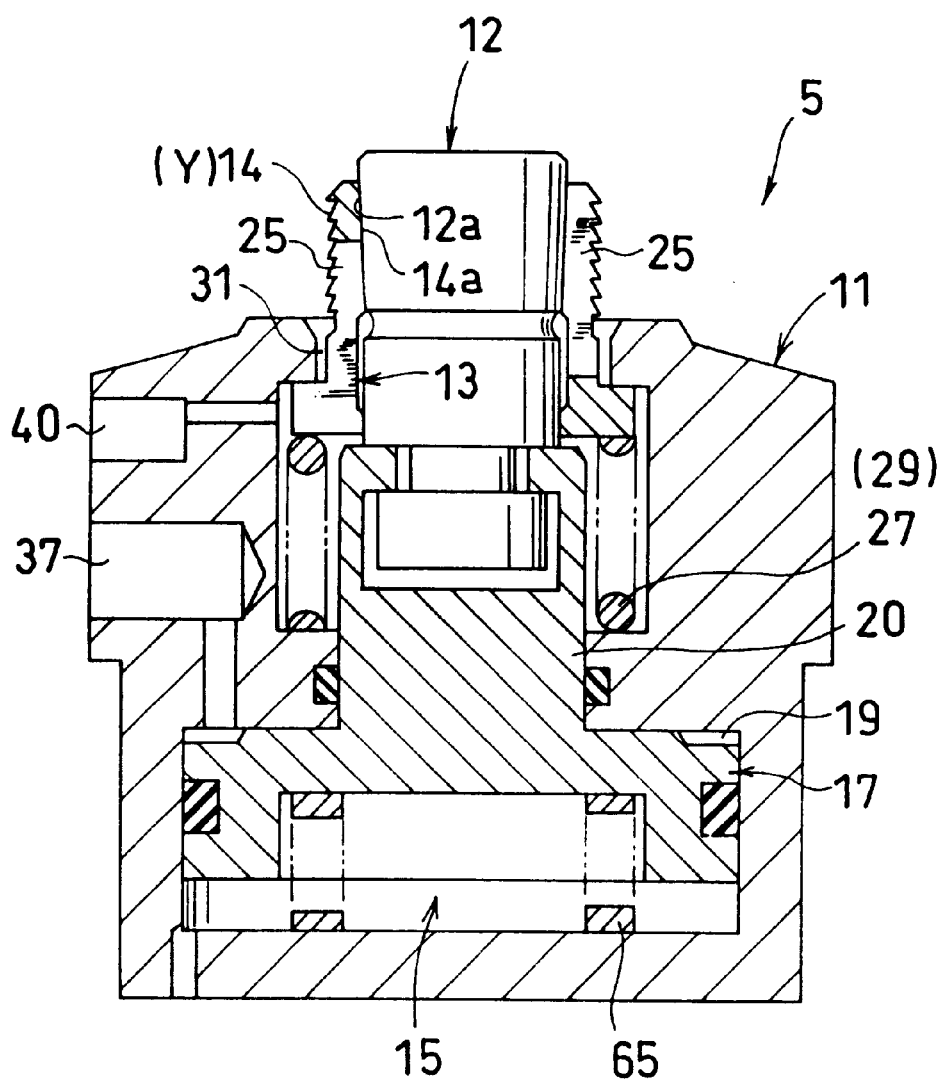
FIG. 11 shows a fifth embodiment of the present invention and corresponds to FIG. 1(A)

FIG. 11 illustrates a fifth embodiment and corresponds to FIG. 1.

This FIG. 11 shows an apparatus simplifying the apparatus of FIG. 1 and differs therefrom on the following point.

The driving means 15 comprises a hydraulic cylinder of single acting and spring return type.

More specifically, the piston 17 has an upper side provided with the clamping actuation chamber 19 and a lower side to which a return spring 65 is attached. The support means 29 for the collet 13 is composed only of the push spring 27. And the collet 13 has a peripheral wall provided with a plurality of slits 25 opening toward its upper surface and its lower surface and arranged alternately in a peripheral direction.

Like the apparatus of FIG. 1, the pull rod 12 is adapted to be horizontally movable while aligning, relatively to the piston rod 20. The pull rod 12 and the collet 13 are also adapted to be horizontally movable while aligning, relatively to the housing 11.

The driving means 15 of cylinder type may be formed into a double acting type similar to that of FIG. 1.

Figure 12:
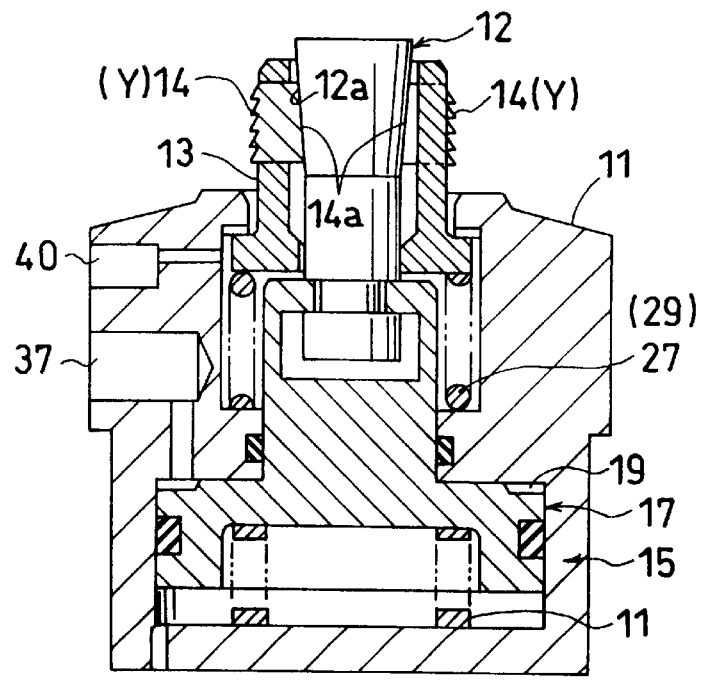
FIG. 12 shows a sixth embodiment of the present invention and corresponds to FIG. 11.

FIG. 12 illustrates a sixth embodiment and corresponds to FIG. 11.

FIG. 12 shows an apparatus different from the apparatus of FIG. 11 in that the annular member 13 corresponding to the collet is formed to be separated from the engaging member 14. Speaking it in more detail, the annular member 13 has a peripheral wall provided with a plurality of engaging members 14 peripherally spaced apart at a predetermined distance. The engaging members 14 are supported by the annular member 13 so as to be horizontally movable. And the piston 17 drives the pull rod 12 downward to thereby make the tapered outer peripheral surface 12a push the respective engaging members 14 to the radially outward engaging position.

Further, it is preferable to attach between the annular member 13 and the engaging members 14, a return spring (not shown) for forcedly returning the engaging members 14 from the engaging position to the disengaging position (Y).

Figure 13:
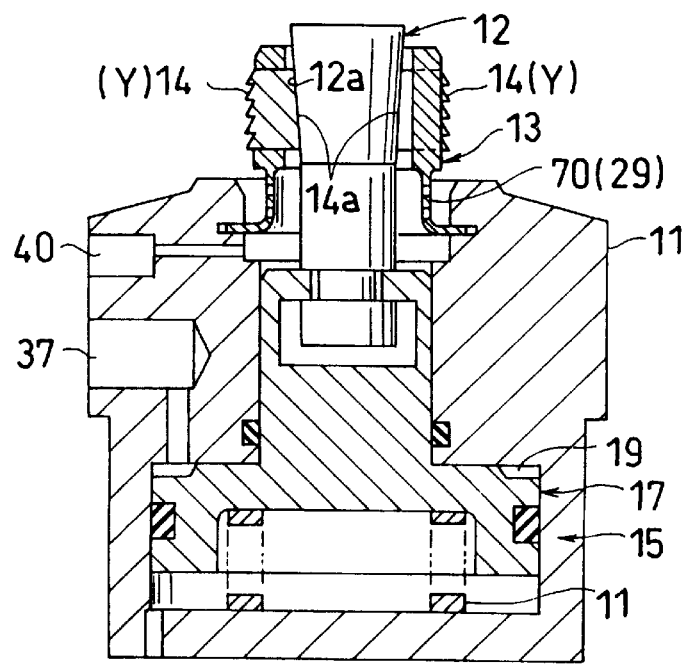
FIG. 13 shows a seventh embodiment of the present invention and corresponds to FIG. 12.

FIG. 13 illustrates a seventh embodiment and corresponds to FIG. 12.

FIG. 13 shows an apparatus different from the apparatus of FIG. 12 in that the push spring 27 in FIG. 12 is omitted and instead a lower half portion 70 of the annular member 13 is formed in the shape of a spring and that the support means 29 is composed of a resilient force owned by the lower half portion 70.

Speaking it in more detail, the engaging member 14 is pushed up by the resilient force of the lower half portion 70. At the time of clamp driving, when a downward clamping force acts on the engaging member 14 from the pull rod 12, the lower half portion 70 downwardly and resiliently displaces. This allows the engaging member 14 to downwardly move to thereby pull the workpiece (not shown) to the support surface of the housing 11 and fixes it thereto.

It is to be noted that the annular member 13 has a lower portion fitted into an upper portion of the housing 11 so as to be movable while aligning.

The respective embodiments can be further modified as follows.

The illustrated integrally formed collet 13 may be formed from a plurality of segments able to radially expand and contract and each of the segments may be provided with an engaging member instead of providing the engaging member 14 on the integral collet 13.

The engaging member 14 may be engaged with the engaging hole 2 by causing the engaging member 14 to bite into the engaging hole 2 due to elastic deformation instead of due to plastic deformation or by bringing the former into frictional contact with the latter.

The engaging member 14 may have peripheral grooves in the shaped of knurls, an uneven rugged surface or the like instead of having the saw-tooth shape or the triangular shapes as illustrated above, when seen in section and further the peripheral grooves may be omitted.

The support means 29 may utilize rubber or the like resilient force instead of the push spring 27.

The driving means 15 may employ an electric motor, an impact wrench or the like other kinds of actuators instead of the hydraulic cylinder.

The support surface (S) for receiving the workpiece 1 may be provided on the work pallet 4 instead of on the housing 11.

The object to be fixed may be a metal mold or the like instead of the workpiece 1.

What is claimed is:

1. A clamping apparatus, comprising:
   a driving means (15) provided within a housing (11);
   a pull rod (12) having an axis and being reciprocally movable in an axial direction by the driving means (15);
   a tapered outer peripheral surface (12a) provided on the pull rod (12), the tapered outer peripheral surface (12a) narrowing toward a first end in the axial direction;
   an annular member (13) externally fitted onto the pull rod (12) so as to be movable in the axial direction;
   an engaging member (14) provided on a peripheral wall of the annular member (13) and arranged in an outer peripheral space of the tapered outer peripheral surface (12a) so as to be inserted into an engaging hole (2) of an object (1) to be fixed;
   an annular gap (31) defined between the housing (11) and an outer peripheral surface of the annular member (13), the annular gap (31) being communicated with a cleaning fluid supply port (40) provided in the housing (11); and
   a support means (29) inhibiting the engaging member (14) from displacing to the first end in the axial direction with a predetermined supporting force and allowing the engaging member (14) to displace to the first end with a force larger than the supporting force, wherein the pull rod (12), when driven toward the first end, makes the tapered outer peripheral surface (12a) change over the engaging member (14) to an engaging position (X) far away from the axis so as to engage it with the engaging hole (2) and displacing the engaging member (14) to the first end against the support means (29), thereby adapting a driving force of the pull rod (12) to be transmissible to the object (1) to be fixed, and on the other hand, when driven toward a second end in the axial direction, the pull rod (12) allows the engaging member (14) to change over to a disengaging position (Y) close to the axis.

2. A clamping apparatus, comprising:

a driving means (15) provided within a housing (11);

a pull rod (12) having an axis and being reciprocally movable in an axial direction by the driving means (15), the pull rod (12) being connected to the driving means (15) so as to be radially movable;

a tapered outer peripheral surface (12a) provided on the pull rod (12), the tapered outer peripheral surface (12a) narrowing toward a first end in the axial direction;

an annular member (13) externally fitted onto the pull rod (12) so as to be movable in the axial direction;

an engaging member (14) provided on a peripheral wall of the annular member (13) and arranged in an outer peripheral space of the tapered outer peripheral surface (12a) so as to be inserted into an engaging hole (2) of an object (1) to be fixed;

an annular gap (31) defined between the housing (11) and an outer peripheral surface of the annular member (13), the annular gap (31) allowing the pull rod (12) and the annular member (13) to move radially with respect to the housing (11); and a support means (29) inhibiting the engaging member (14) from displacing to the first end in the axial direction with a predetermined supporting force and allowing the engaging member (14) to displace to the first end with a force larger than the supporting force, wherein the pull rod (12), when driven toward the first end, makes the tapered outer peripheral surface (12a) change over the engaging member (14) to an engaging position (X) far away from the axis so as to engage it with the engaging hole (2) and displacing the engaging member (14) to the first end against the support means (29), thereby adapting a driving force of the pull rod (12) to be transmissible to the object (1) to be fixed, and on the other hand, when driven toward a second end in the axial direction, the pull rod (12) allows the engaging member (14) to change over to a disengaging position (Y) close to the axis.

3. A clamping apparatus as set forth in claim 1, wherein the support means (29) comprises a push spring (27) urging the engaging member (14) toward the second end in the axial direction.

4. A clamping apparatus as set forth in claim 1, wherein the housing (11) is detachably provided with an adapter block (22) for receiving the object (1) to be fixed, the pull rod (12) being inserted into the adapter block (22) movably in the axial direction.

5. A clamping apparatus as set forth in claim 4, wherein the pull rod (12) is detachably connected to the driving means (15).

6. A clamping apparatus as set forth in claim 1, wherein the housing (11) includes a lift member (51) arranged to be movable in the axial direction, the lift member (51) being provided with the driving means (15) and the pull rod (12).

7. A clamping apparatus as set forth in claim 1, wherein the annular member comprises a collet (13), the collet (13) having a peripheral wall which forms the engaging member (14).

8. A clamping apparatus as set forth in claim 7, wherein the support means (29) comprises a push spring (27) urging the engaging member (14) toward the second end in the axial direction.

9. A clamping apparatus as set forth in claim 7, wherein the housing (11) is detachably provided with an adapter block (22) for receiving the object (1) to be fixed, the pull rod (12) being inserted into the adapter block (22) so as to be movable in the axial direction.

10. A clamping apparatus as set forth in claim 9, wherein the pull rod (12) is detachably connected to the driving means (15).

11. A clamping apparatus as set forth in claim 7, wherein the housing (11) includes a lift member (51) arranged to be movable in the axial direction, the lift member (51) being provided with the driving means (15) and the pull rod (12).

12. A clamping apparatus as set forth in claim 2, wherein the support means (29) comprises a push spring (27) urging the engaging member (14) toward the second end in the axial direction.

13. A clamping apparatus as set forth in claim 2, wherein the housing (11) is detachably provided with an adapter block (22) for receiving the object (1) to be fixed, the pull rod (12) being inserted into the adapter block (22) so as to be movable in the axial direction.

14. A clamping apparatus as set forth in claim 13, wherein the pull rod (12) is detachably connected to the driving means (15).

15. A clamping apparatus as set forth in claim 2, wherein the housing (11) includes a lift member (51) arranged to be movable in the axial direction, the lift member (51) being provided with the driving means (15) and the pull rod (12).

16. A clamping apparatus as set forth in claim 2, wherein the annular member comprises a collet (13), the collet (13) having a peripheral wall which forms the engaging member (14).

17. A clamping apparatus as set forth in claim 16, wherein the support means (29) comprises a push spring (27) urging the engaging member (14) toward the second end in the axial direction.

18. A clamping apparatus as set forth in claim 16, wherein the housing (11) is detachably provided with an adapter block (22) for receiving the object (1) to be fixed, the pull rod (12) being inserted into the adapter block (22) so as to be movable in the axial direction.

19. A clamping apparatus as set forth in claim 18, wherein the pull rod (12) is detachably connected to the driving means (15).

20. A clamping apparatus as set forth in claim 16, wherein the housing (11) includes a lift member (51) arranged to be movable in the axial direction, the lift member (51) being provided with the driving means (15) and the pull rod (12).

* * * * *

(12) EX PARTE REEXAMINATION CERTIFICATE (5601st)
United States Patent
Yonezawa

(10) Number: US 6,095,509 C1
(45) Certificate Issued: Nov. 7, 2006

(54) CLAMPING APPARATUS

(75) Inventor: Keitaro Yonezawa, Kobe (JP)

(73) Assignee: Kabushiki Kaisha Kosmek, Kobe (JP)

Reexamination Request:
No. 90/007,406, Jan. 31, 2005

Reexamination Certificate for:
Patent No.: 6,095,509
Issued: Aug. 1, 2000
Appl. No.: 09/209,004
Filed: Dec. 11, 1998

(30) Foreign Application Priority Data

Dec. 24, 1997 (JP) .............................................. 9-354553

(51) Int. Cl.
B25B 5/14 (2006.01)
B25B 5/06 (2006.01)
B25B 5/00 (2006.01)
B25B 5/08 (2006.01)
B23B 31/20 (2006.01)

(52) U.S. Cl. ....................................................... 269/309

(58) Field of Classification Search ........................ None
See application file for complete search history.

(56) References Cited

FOREIGN PATENT DOCUMENTS

DE 40 20 981 A1 1/1992
EP 0 785 049 7/1997
JP 9-285925 11/1997

*Primary Examiner*—David O. Reip

(57) ABSTRACT

A housing (11) has a piston (17) inserted thereinto. A pull rod (12) is connected to the piston (17). An annular collet (13) is externally fitted onto the pull rod (12). When clamping, an engaging member (14) provided on a peripheral wall of the collet (13) is inserted into an engaging hole (2) of a workpiece (1) and the piston (17) is lowered. Then a tapered outer peripheral surface (12a) of the pull rod (12) diametrically expands the engaging memeber (14) to engage it with the engaging hole (2) and the collet (13) slightly descends against a push spring (27). Thus a downward driving force acting on the pull rod (12) is transmitted to the workplace (1) via the engaging member (14) and the workpiece (1) is pulled and fixed to a support surface (S) of the housing (11).

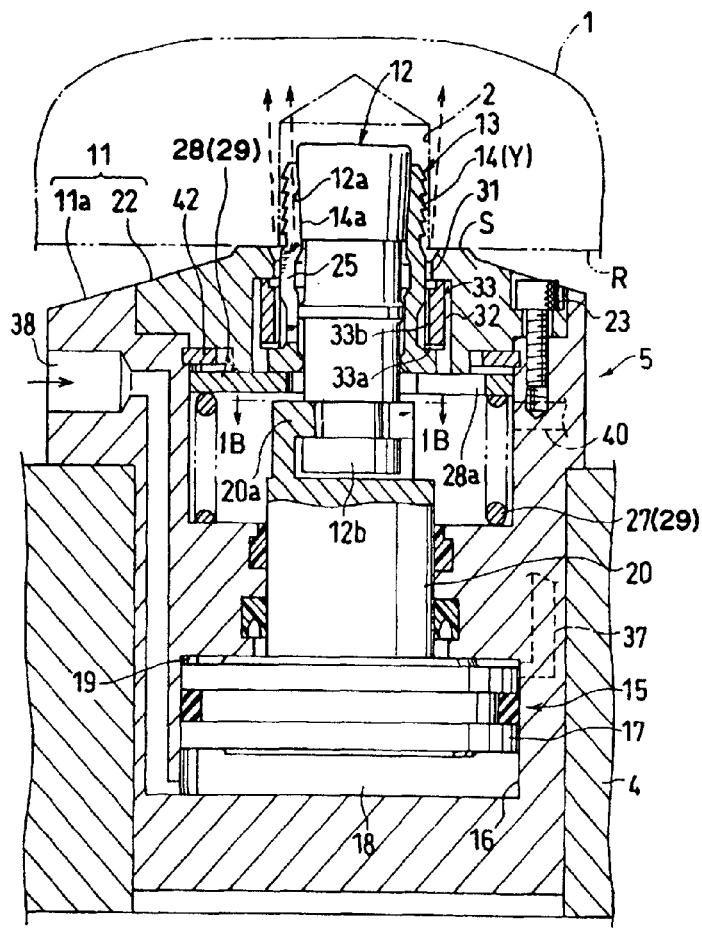

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

* * * * *